July 22, 1958     E. GEMMER     2,844,489
FLUIDIZED BED COATING PROCESS Filed Dec. 20, 1957     3 Sheets-Sheet 1

FIG. 1

INVENTOR

ERWIN GEMMER

BY
ATTORNEYS

ERWIN GEMMER
INVENTOR

FIG. 3

ERWIN GEMMER
INVENTOR

United States Patent Office 2,844,489
Patented July 22, 1958

2,844,489

FLUIDIZED BED COATING PROCESS

Erwin Gemmer, Frankfurt am Main, Germany, assignor to Knapsack-Griesheim Aktiengesellschaft, Knapsack, near Koln, Germany, a German company Application December 20, 1957, Serial No. 704,106

6 Claims. (Cl. 117—20)

The present invention relates to protective coatings and to a method and means of producing such coatings on the surfaces of articles, and the application is a continuation-in-part of United States patent applications Serial No. 427,481, filed May 4, 1954 and Serial No. 551,943, filed December 8, 1955, now abandoned.

An important object of the present invention is the production of uniform coatings which are particularly suitable for protecting the surfaces of articles which are exposed to normally destructive solvents, chemicals, or corrosive agents, or which must be electrically insulated, or which must resist mechanical abrasive or frictional wear. Some of the materials from which the articles to be coated may be made include the various metals such as steel, aluminum, zinc and other materials disclosed in my copending application Serial No. 551,943.

Materials which possess superior resistance to chemicals and solvents or which are electrical insulators or which are resistant to mechanical abrasive or frictional wear often are quite expensive and do not possess sufficient mechanical strength and rigidity for use other than as coatings in mechanical structures. Also, the very resistance to solvents and other chemicals for which these materials may be valued make them difficult to use in the production of coatings by common presently known methods, such as by painting or spraying in a liquid solvent or liquid dispersion form.

Accordingly, it is another important object of the present invention to provide a new and improved process for the production of uniform coatings without the necessity for the use of liquid solvents or dispersing agents for the coating materials.

In practicing a process of coating heated articles by immersion in fluidized beds of dry and pulverulent solid coating materials, it has become apparent that simple immersion in the fluidized bed often is not sufficient to cause the formation of a complete and uniform and smooth coating on the article which is immersed. This observation is particularly true with respect to downwardly facing surfaces of articles.

Therefore, another important object of the present invention is to provide an improved process which is particularly suited for uniformly coating articles which, during the period of immersion in the fluidized bed, have a substantial portion of the immersed surface in a downwardly facing position. Articles which have a relatively plain shape as well as articles with irregular or complex shapes may be advantageously coated by the process of this invention. Some of the articles that may be advantageously coated are set forth hereinafter.

Other objects and advantages of the invention will be apparent from the following specification.

This invention is particularly valuable for, and applicable to, the production of coatings from high-melting high molecular weight organic polymeric thermoplastic resins such as polyethylene and the linear polyamides generally referred to as nylons. Nylons which are particularly useful are polyhexamethylene adipamide, polyhexamethylene sebacamide, and the polycaprolactams such as the polymer of epsiloncaprolactam. However, the uniform protective coatings of this invention may consist of practically any material which has (1) a transient decomposition point which is reasonably higher than its melting point, and (2) a sintering temperature lower than the melting or decomposition point of the material from which the particular articles to be coated are made.

Among other coating materials which are suitable for the present purposes are most of the thermoplastic resins or those having a thermoplastic phase, and especially those which have a transient decomposition temperature which is sufficiently removed from the melting temperature thereof to permit the material to be applied to the article to be coated by melting. Specific examples of additional materials useful for this purpose are polystyrenes, acrylic resins, bitumen such as gilsonite or asphalt, shellac, and wax. Various mixtures of two or more of the above materials may also be employed for the production of coatings in accordance with the present process. In cases where one of the materials in a coating mixture has a melting point which is substantially below the others, the low-melting material acts somewhat as a binder and the high-melting materials as fillers. Various other filler materials may also be added to any of the above coating materials for various purposes such as to impart desired properties or to reduce the cost of the coating materials. Examples of suitable filling materials, for instance, are powdered asbestos, slate, metal powders, heat stable powdered pigment materials, and polytetrafluoroethylene. Abrasive articles may be made by using abrasive fillers. Various other suitable coating materials and mixtures (including graphite as a nonfusible material) are given in the examples described below and in my copending applications Serial Nos. 551,943 and 608,726.

The coating material should preferably be pulverulent in order that it may be readily fluidized as explained below. In addition, it sholud be capable of being mixed together without appreciable packing or cohesion of the particles into larger aggregates.

In carrying out the coating process of this invention the coating material, preferably in the form of pulverulent granules, is transformed into a continuously fluidized bed, by introducing at least one current of gas under pressure therein; the bed being maintained in the fluidized state by controlling the flow of the gas. The article to be coated is at least partially immersed into the fluidized bed of the coating material while the article is heated, for example by heating the article before immersion. In order to produce the desired uniform coating, the article is kept in motion during the immersion period as by moving it to and fro (which includes movement in a horizontal or vertical direction). Individual particles of the coating material adhere and melt and fuse together with other particles on the hot surface of the immersed portion of the article to form a continuous coating thereon, as described more fully below.

A fluidized bed is, by definition, a mass of solid particles which exhibits the liquid-like characteristics of mobility, hydrostatic pressure, and an observable upper free surface or boundary zone across which a marked change in concentration of particles occurs. This "fluidized bed" is defined as differing from a "dispersed suspension" because in the latter, ". . . an upper level or interface is not formed under conditions of continuous solids entrainment and uniform superficial velocity." (This is usually observed under conditions of low solids concentration and either high fluid velocity or low solids feed rate. Thus, in general, a dispersed suspension is analogous to a vapor, whereas a fluidized bed is analogous to a liquid. One example of this condition is observed in pneumatic transport. In a vessel containing a fluidized bed a dilute suspension of entrained particles above the bed also is such a dispersed suspension, and is frequently referred to as the "disperse phase" while the bed itself is referred to as the "dense phase.") The fluidized bed is thus alternatively defined as a "dense phase." These definitions are to be found in the article entitled "Fluidization Nomenclature and Symbols" appearing at pages 1249 and 1250 in "Industrial and Engineering Chemistry," vol. 41, No. 6, June 1949.

The preheating of the article should be to a temperature above the sintering or melting point of the coating material. By "melting point" is here meant that stage wherein the coating material is sufficiently coalesced to provide a continuous coating of the article. By "sintering point" is here meant that stage wherein the coating material is sufficiently "tacky" or "sticky" to adhere to the surface of the article.

If required, the coating may be reinforced by repeating the above-described process of application, that is, by re-heating and re-dipping the article.

Preferred apparatus for carrying out the process will be hereinafter more fully described in conjunction with detailed reference to the accompanying drawings wherein.

Various types of holding means for the article may be used. For instance, it is possible to merely use a pair of tongs with which the article is manually dipped into the fluidized bed, moved to and fro or up and down, and is then withdrawn. It is also possible to use racks, conveyors, or other similar article-carrying means as described and illustrated in my copending application Serial No. 551,943.

In many instances it is preferable to mask the article holder or portions of the article being coated to prevent coating thereof. It has been found that a covering of various silicone resins which are of a grease-like consistency form particularly suitable masking materials.

Any gas which is reasonably inert at the temperatures and with the materials employed may be used as the gaseous medium for fluidizing the coating material. Air is usually satisfactory and is preferred for reasons of economy; however, in order to avoid oxidation, it is sometimes preferable to use nitrogen or some other non-oxidizing gas. The pressure of the gas may vary greatly, depending on the particular shape and dimensions of the treating tank as well as on the particular type of coating material used. The pressure of the gas, however, should not exceed the point where the upper level of the fluidized bed of coating material rises above the sides of the container or where an appreciable dust cloud of the coating material is formed above the container. In fact, the maximum pressure should be such as to prevent the production of any significant quantities of dust cloud of the coating material. Generally, the minimum gas pressure will be about 7 inches water column. The supply gas pressure may be as high as about 15 atmospheres depending on the inside diameter of the gas connection. The consumption of the gas will generally be from about 70 to about 700 cubic feet per hour. It will be understood, of course, that the rate of gas flow is very dependent upon the size and configuration and design of the apparatus which is used for the practice of the process.

The fluidized bed should preferably be maintained at a temperature which is sufficient to prevent the accumulation of moisture in the bed. This can be conveniently accomplished by slightly raising the temperature of the gaseous medium. However, caution should be always taken to maintain the temperature of the gas and, therefore, of the fluidized bed, below the melting temperature of the coating material.

The coating material, as has been stated above, is preferably used in pulverulent form and preferably has a granular size of between about 0.001 and about 0.024 inch. Best results have been obtained with a granular size of between 0.002 and about 0.012 inch.

The period of immersion in the fluidized bed may vary with relatively wide limits depending upon the thickness of the coating desired. Depending upon the size and heat capacity of the article to be coated, the thickness of the coating desired, the powdered coating material used, and the temperature to which the article is preheated before coating, the best immersion time may vary from a fraction of a second up to several minutes. Generally, the time of immersion is kept below about 50 seconds, and, preferably below about 30 seconds. During this period of time, if desired, the article may be repeatedly immersed and withdrawn from the fluidized bed to observe the progress of the formation of the coating and when the coating thickness appears adequate, further immersions need not be made.

When the article is removed from the fluidized bed, it initially appears covered with a powder. After a short interval of time, however, this powder melts, or coalesces into a continuous coating due to transfer of heat from the heated article. It will be understood that it is possible to permit the article to remain in the fluidized bed for an indefinite period during which the article may cool and the coating may solidify. If this is done, the coating will be relatively heavy and will possess a rough, powdery outer surface of powdered coating material which has not fully coalesced and is not entirely coherent to the remainder of the coating. It will be found, however, that the intermediate portions of the coating between the outermost surface and the innermost portions will possess progressively greater degrees of coalescence and that the innermost portions will be completely coalesced into a continuous covering for the article. Such a coating structure is desirable for some purposes.

If thin-walled articles are to be coated, the heat energy therein is sometimes not sufficient to cause the melting of the powder on the surface layer of the coating material; although the under-layer, or layer immediately adjacent to the article, has been melted. In such case, higher preheating temperatures can be used or the surface of the coating may be subsequently treated with a small gas torch flame or the article may be placed in an oven or heated by other means until the surface layer has been completely melted. This procedure may also be employed to completely melt the heavy coating produced when the article is permitted to cool in the fluidized bed as described at the end of the above paragraph, if desired. Only a few seconds are generally required to smooth off the surface with the flame; whereas heating time in the oven should be about 5 to 10 minutes; although this time will vary with the materials being used. When the coating material is polyethylene, a post-heating temperature range from about 250° F. to 285° F. for about 5 to 10 minutes has been found to be satisfactory. With some materials, such as the polyamides, a relatively short postheating period in a relatively hot oven is best, while with other materials, a longer treatment period in a cooler oven is best. With still other materials, it is inadvisable to heat the article at all after coating because such heating may injure the coating and provide unsatisfactory results. The coating is preferably allowed to cool slowly after which the coated articles are ready for use. It will be appreciated, however, that for some coating materials it may be preferable and more economical to rapidly cool the coatings such as by quenching in water. It may also be desirable, particularly where slow cooling is employed, to exclude oxygen during the cooling step in order to avoid excessive oxidation of the cooling material. The resultant coating is smooth, coherent, has good adhesion, and is free from pores.

It is sometimes necessary, in order to obtain a good adhesion of the coating to the surface of the article, to clean and roughen the surfaces thereof as, for example, by means of sand or metal-grit blasting or acid etching. This is particularly true of relatively large articles having relatively complex contours. For relatively small articles which do not have any concavities and larger articles having only convex surfaces to be coated, the sandblasting step may be omitted, since there is generally a certain amount of shrinkage of the coating onto the article so that a tight adhesion is automatically effected. If the surfaces of the articles to be coated are likely to be greasly or oily, they should be degreased by a proper treatment with a suitable solvent such as carbon tetrachloride.

Figure 1:
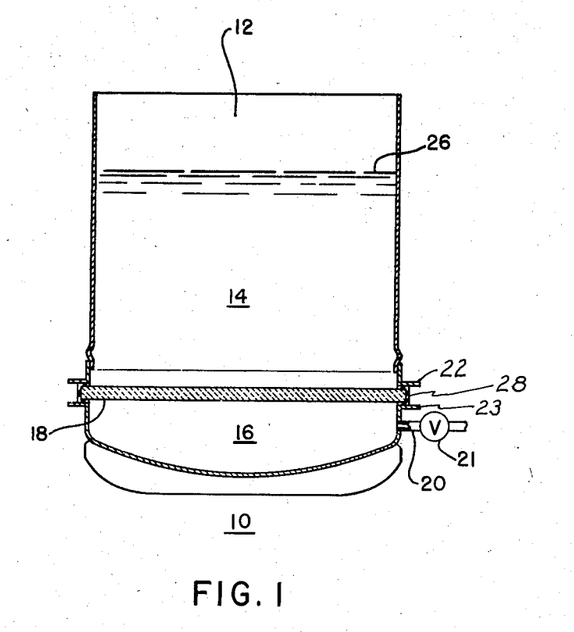
Fig. 1 is a side view in section, of a tank or container for holding a fluidized bed, embodying the present invention.

Apparatus 10 for carrying out the process of the present invention generally includes an open-topped container 12 of suitable cross-section, which is horizontally divided into an upper and lower chamber 14 and 16, respectively, by means of a porous partition 18. This partition, which should be pervious to the gas used but impervious to the particles of coating material, may preferably take the form of a porous ceramic plate, although other similar structures may be advantageously used. A porous plate structure which is preferred is composed of an Alundum refractory material composed of fused alumina grains bonded together with an aluminous glass at a high firing temperature. Whether composed of this or other materials, the porous plate preferably has a gas permeability which may be defined as that which will permit the passage of from one to fifteen cubic feet of air at 70° F. and 25 percent relative humidity through an area of one square foot and a plate thickness of one inch at a pressure differential equivalent to two inches of water in a period of one minute. The average pore diameter of the porous plate should preferably be in a range from 0.003 to 0.004 of an inch or less. Although the porous plates may be used in a wide range of thickness, when the above-mentioned Alundum refractory material or similar porous materials are used, a preferred range of thickness is from about 0.4 to 1.2 inches and an excellent thickness has been found to be about 0.8 inch.

It is advantageous to have a container 12 in which the walls incline outwardly toward the top, because the smaller particles tend to ascend to greater heights in the fluidized bed, and such a configuration therefore tends to produce a more uniform coating and retards the loss of the fine particles by entrainment. Other details of the container and the porous plate are shown and described in Serial No. 551,943.

The base 16 is separated from the upper portion of the tank 14 by a horizontal slot defined by upper and lower flanges 22 and 23. Bolts not shown extend through corresponding openings in these flanges to clamp the upper portion of the tank to the base 16. Nuts hold the bolts in clamped position. In the slot defined by the flanges 22 and 23 is removably positioned the ceramic filter plate 18 which may be composed of an Alundum refractory material as described above. A removable flexible, channel-shaped shield 28 is inserted in the slot around the plate 18, the upper and lower flanges of the shield being frictionally clamped between the filter plate and the respective upper and lower flanges. By this construction, filter plates having the desired porosity for any particular job may be interchangeably used in the same apparatus.

The pulverulent coating material is placed on the upper surface of the partition so that the articles to be coated can be, at least partially, immersed therein. Thereafter, a gas under pressure, as for example, air or nitrogen, is blown into the lower chamber of the container through the pipe 20 and the valve 21 and penetrates through the porous partition into the powder, causing the powder to be converted into a continuously fluidized bed. A blower or fan may be built into the container 12 to supply the gas. The fluidized bed behaves substantially like a fluid so that it comes into contact with all the surfaces of the article. When fluidized, the individual particles become separated from one another and the bed of coating material appears to expand to occupy a greater volume and the upper surface of the mass of coating material 26 therefore rises to an equilibrium level within the container.

It will be seen from the following explanation, that it is very desirable that the gas should pass through the porous plate through many small, closely-spaced pores in very minute gas streams emanating from such pores. Accordingly, it is important that there be some appreciable degree of resistance to the gas flow through every portion of the porous plate and a measurable pressure drop across the porous plate so as to assure that there is an equalization of pressure on the bottom of the plate and a resulting even flow and equal flow through all portions thereof. It will be seen, therefore, that the many tiny streams of gas which are flowing through the individual pores of the porous plate, when considered in combination, comprise an upwardly moving column of gas, all of the components of which are moving upwardly at substantially uniform parallel speeds.

Before the article is immersed into the fluidized bed, it is preheated to a temperature above the sintering temperature but below the decomposition point of the fluidized material. When this preheated article is immersed into the fluidized bed and kept in motion as described above, the fluidized powder flows into all crevices, channels, holes, grooves and the like so that every part of the article comes into contact therewith. It will be understood, of course, that if the coating is only required on a portion of the article, only that portion need be immersed.

Figure 3:
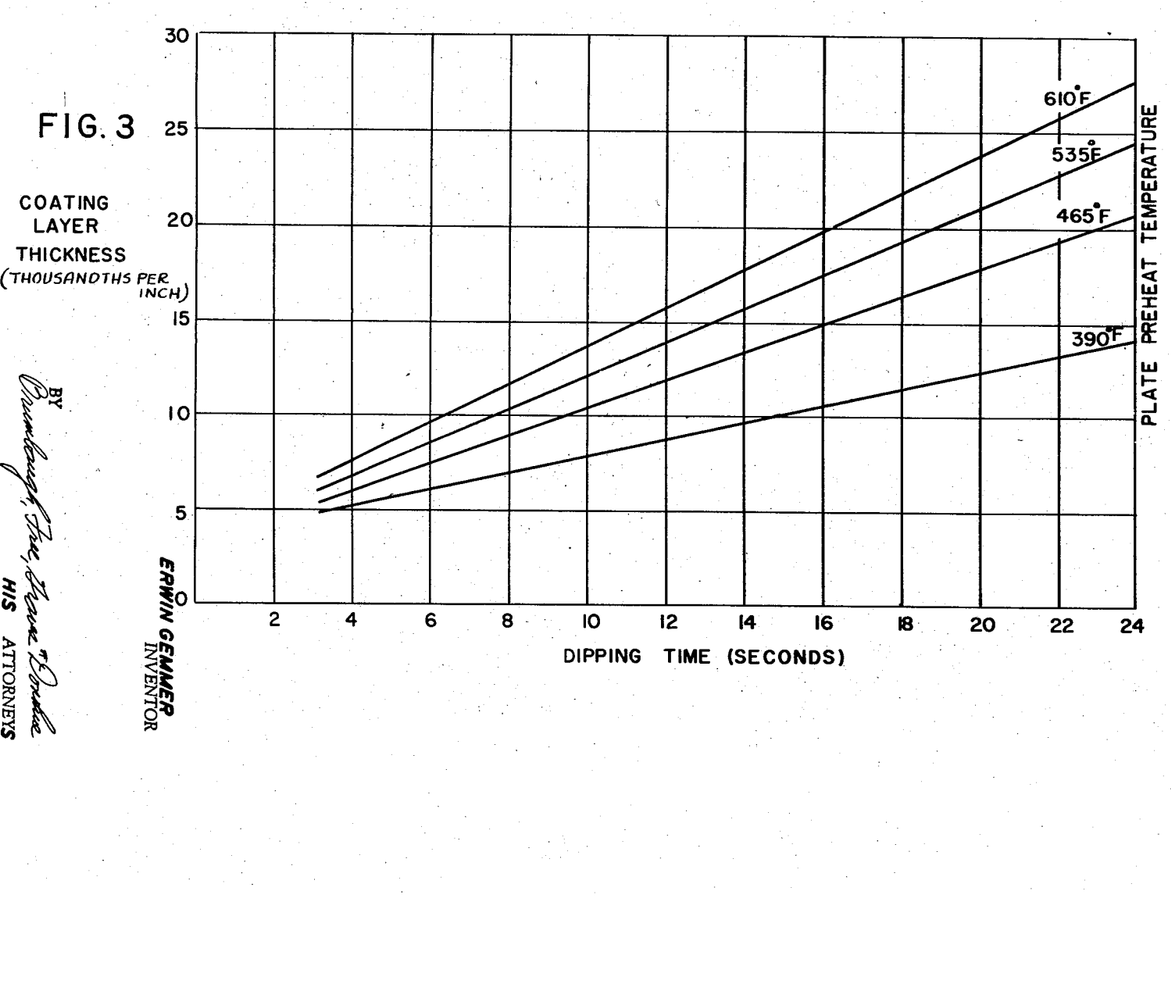
Fig. 3 is a chart showing dipping time (powder contact time) vs. thickness of coating layer when using polyethylene as the coating material in the present process at various preheat temperatures; this chart being only representative of the characteristics of the many materials which may be used.

The thickness of the coating can be largely regulated by regulation of the preheating temperatture of the article as well as regulation of the time of immersion. The relationship of these factors is illustrated for one coating material in connection with Fig. 3 which is a chart showing the relationship between the dipping (contacting) time and the thickness of the coating layers. The curves on this chart are based on the use of polyethylene as the coating material, and it is presented as an example relating generically to any of the aforementioned coating materials. In the tests performed for the purpose of preparing this chart, the articles coated consisted of steel having a wall thickness of one-eighth of an inch. Where thicker walls are used, the curves begin at approximately the same point but, as the contact time increases, the curves become steeper. For longer dipping times than shown on the chart, all curves asymptotically approach the horizontal. The particle size of the coating material was in the range from 200 to 400 microns. Corresponding charts for other materials show different absolute values but the same or similar characteristic curve shapes.

The best preheating temperature for coating in accordance with the process of this invention is very largely dependent upon the size and shape and thickness and heat-storage capacity of the article to be coated. If the article is small and therefore has a low heat-storage capacity, at a low preheat temperature, the heat-storage in the article will be insufficient for the purpose of melting and causing adherence of a sufficient amount of the coating material to provide a satisfactory coating. On the other hand, if the article is relatively large or has a thick cross-section so that the heat-storage capacity is high, if the article is heated to a relatively high temperature, the period of cooling of the article after coating will be unduly extended and excessive oxidation or degradation of the coating may result.

Also, the preheating temperature must obviously be related to the sintering temperature of the coating material and must exceed that temperature. For instance, for polyethylene having a melting temperature in the order of 240° F., it has been found that metal articles can be satisfactorily preheated from 300° to 570° F. or preferably in a range from 430° to 480° F. for the production of satisfactory coatings. It may be stated that the maximum possible range of preheating temperatures for the practice of the process of this invention would be as follows: the low limit would correspond to the melting or softening point of the material which is to form the coating, and the upper limit of the temperature range would correspond to the temperature at which the article to be coated would deform or melt, or at which the article or the coating material would decompose. Other suitable temperatures, even above the decomposition temperature of the coating material are described in the copending application Serial No. 551,943.

In the procedures described in the following examples the article being coated was maintained in a to and fro motion while heated and immersed in the fluidized bed of pulverulent coating material. The effect of the to and fro motion of the article while immersed in the fluidized bed in improving the coating, particularly on downwardly facing surfaces, may be due to the formation of eddy currents in the stream of gas ascending through the fluidized bed which bring more powder into contact with such surface, or to the disruption of a possible zone of relatively stagnant gas below the surface with the same result. However, the invention is not limited to any particular theory.

As mentioned above, the process of this invention is adapted for coating articles composed of many different materials and for the application of coatings of many different materials. The following examples are therefore set forth merely for the purpose of illustrating how the process may be used for various materials, without necessarily limiting the scope of the invention thereto.

*Example 1*

A steel plate, the dimensions of which were 7.9 inches by 15.8 inches by 0.118 inch, was coated with polyethylene. The procedure consisted of, first, preheating the workpiece in an oven at about 609° F. The preheated article was then immersed in a fluidized bed of the polyethylene for about 14 seconds. The fluidized bed consisted of pure polyethylene having a particle size of between about 0.0078 inch and 0.0157 inch. The fluidizing gas used was nitrogen, at a supply pressure of about 4 atmospheres and at a temperature of about 68° F. The thickness of the resulting coating was about 0.030 inch. This coating was absolutely free from pores, smooth and glossy. A test with an electric spark device at 25,000 volts indicated no break-down of the coating.

A workable range of preheat temperatures for the article when employing polyethylene as the coating material is from 375° to 700° F. By way of further illustration, with a metal plate having a thickness of about 0.4 inch which is preheated to a temperature of approximately 480° F. and dipped for 40 seconds into the fluidized coating material of Example 1, a coating of a thickness of about 0.040 inch is produced. But if the preheating temperature is dropped to 390° F. and the dipping time and the coating material remain the same, a coating which is only 0.028 inch in thickness results.

*Example 2*

A small toothed wheel having a diameter of about 5.9 inches, and having 18 teeth with a tooth face width of about 0.40 inch, was preheated to a temperature of about 662° F. It was then immersed for about 5 seconds into a fluidized bed of high molecular weight polycaprolactam which was being fluidized by compressed air at a supply pressure of about 3.8 atmospheres. The particle size of the coating material was between about 0.002 inch to 0.0059 inch. The workpiece was then removed from the fluidized bed and subjected to a further heat treatment, at a temperature of between about 320° F. to 356° F. for approximately 5 minutes. The resulting coating layer had a thickness of about 0.0079 inch and was uniformly monochromatic, glossy and hard.

*Example 3*

An aluminum sieve plate 15.8 inches long and 4.8 inches wide and containing 80 holes, each of which is 0.20 inch in diameter, was heated in an oven to approximately 465° F. The plate was then immersed for approximately 12 seconds in a fluidized bed consisting of polymerized methylmethacrylate particles having a size range from about 0.0012 to 0.0047 inch. This treatment resulted in a coating approximately 0.014 inch thick having an excellent surface smoothness and a brilliant appearance without the necessity for further heating.

*Example 4*

A steel plate, similar to that used in Example 1, was treated in the same manner as in Example 1, except that the coating material consisted of 99.9 percent by weight polyethylene and 0.1 percent by weight carbon black. The carbon black was added for the purpose of increasing the adhesive strength of the coating. This change in coating material did not create any substantial change in the process, or in the resultant coating except that the coating was darker than when using pure polyethylene, varying from grayish black to black.

*Example 5*

A small grinding drum 8 inches in diameter, 4 inches in axial depth and having a wall thickness of 0.2 inch, was preheated to about 600° F. It was then immersed for about 15 seconds in a fluidized bed consisting of about 60 percent, by weight, high molecular weight polycaprolactam polyamide and about 40 percent, by weight, polyethylene. The particle size of the polyamide was between about 0.002 and 0.006 inch, while the particle size of polyethylene was between .008 and 0.012 inch. The fluidizing gas was compressed air at a supply pressure of about 4 atmospheres. The reason for the use of the mixture was because the polyamide, although it had a sufficient abrasive strength, did not have sufficient elasticity for the required purpose. It was found that the addition of about 40 percent polyethylene resulted in a coating which had a sufficient amount of elasticity while still being resistant to damage resulting from flying abrasive particles. This coating had a thickness of about 0.02 inch and had a dull luster similar to that of a layer made of pure polyamide.

*Example 6*

A steel bushing 1¼ inches long and having an outside diameter of 1.390 inches and an inside diameter of 1.010 inches, was preheated to a temperature of about 600° F. It was then immersed, for about 4 seconds, in a fluidized bed consisting of the linear polyamide polyhexamethylene adipamide. The particles of the coating material were, in general, of 40 mesh, or in other words, small enough to pass through a 40 mesh screen. The coated article was, thereafter, subjected to a quick pass of a gas flame.

The coating produced had a thickness of approximately 0.010 inch and was very smooth, hard and slightly hazy in appearance. After cooling, the surface of the coating was machined to reduce its thickness to about 0.003 inch.

A workable range of preheat temperatures when coating with polyhexamethylene adipamide is from about 565° to 800° F.

Example 7

A steel plate 3 inches by 5 inches by ¼ inch was heated to about 600° F. and was then immersed for about 5 seconds in a fluidized bed consisting of finely divided polystyrene. The fluidizing gas used was compressed air. After removal from the fluidized bed the workpiece was subjected to a temperature of about 450° F. for about 5 minutes. The coating produced had a thickness of about 0.020 inch and had a very hard, glassy, clear appearance.

After the coating was completely cooled, small cracks were observed in the interior portions of the coating, adjacent the surface of the coated article. These cracks were rather uniformly spaced and formed a grid, giving the coating an appearance similar to a fine-grain alligator skin. Such a coating would have utility for decorative purposes.

Example 8

A steel plate 3 inches by 5 inches by ¼ inch was heated to about 350° F. and was then immersed for about 4 seconds in a fluidized bed containing phenol formaldehyde resin powder. The particle size of the coating material was of 40 mesh.

Unlike the majority of the other examples, the article in this case was not sandblasted before treatment but was, instead, thoroughly cleaned with carbon tetrachloride. A hard, smooth coating, having a thickness of about 0.025 inch, was formed. This coating was relatively clear but had a yellow green cast.

Example 9

A steel plate made of cold rolled steel and having dimensions of 3 inches by 5 inches by ¼ inch was preheated to a temperature of about 375° F. It was then immersed for about 4 seconds in a fluidized bed containing gilsonite (a pure powdered asphalt). The particle size of the gilsonite was about 300 mesh, and compressed air was used as the fluidizing gas. An excellent coating having a thickness of about 0.020 inch was produced. This coating was hard, glossy and somewhat brittle. It was also black in color.

Example 10

A steel plate 3 inches by 5 inches by ⅛ inch was heated to about 640° F. and then immersed for about 5 seconds in a fluidized bed containing about 95 percent, by weight, polyhexamethylene adipamide, and about 5 percent, by weight, molybdenum disulphide. The particle size of the polyhexamethylene adipamide was about 40 mesh, whereas the particle size of the molybdenum disulphide was about 220 mesh. The fluidizing gas used was compressed air. The coated article, after removal from the fluidized bed, was subjected to a very short after-treatment with a gas flame. The thickness of the coating produced was about 0.007 inch and had characteristics very similar to those of the coating produced in Example 6, except that the molybdenum disulphide changed the color of the coating to a light gray.

In addition to the production of coatings, the process of the present invention may also be employed for the production of thin articles of the coating material as described in Serial No. 551,943 by application of the coating material to a heated mold and then stripping the coating from the mold after cooling. The coating material then forms a thin self-supporting article which, of course, is no longer a coating.

In the prior description of the coating process of the present invention, it was suggested that the surface of the article to be coated should preferably be mechanically or chemically roughened, such as by sandblasting or acid etching, in order to improve the adherence of the coating. Conversely, where it is desired to produce hollow articles which are formed from a coating which is stripped from a mold member, the mold member is preferably provided with a very smooth surface which may be highly polished in order to reduce the adhesion of the coating and permit ease in stripping the article from the mold. High temperature releasing agents may also be applied to the mold surface or incorporated in the coating powder formulation in order to enhance the stripping characteristics.

Since the coating materials often have a higher coefficient of thermal expansion than the mold material, the adhesion of the coatings produced in accordance with the process of the present invention may be greatly enhanced if the coating is applied to an exterior surface of a small article, due to the contraction of the coating on the article upon cooling. This adherence is effective even on articles which have smooth surfaces. Because of this effect, some difficulty is sometimes encountered in producing articles by stripping the coatings from molds if the coating is applied to the exterior of a male mold or to convex surfaces. This problem may be overcome by heating the coated mold in boiling water after the coating has solidified. This heating procedure expands the coating, due to both heat and the absorption of water, so that it may be stripped from the mold.

The production of thin articles from the stripped coatings is illustrated by the following example:

Example 11

A steel drill rod having a highly polished surface and a diameter of 0.457 inch was coated over about 3 inches of its length by the procedures described above with polyhexamethylene adipamide. The drill rod mold was preheated at 625° F. and dipped for about 5 seconds in a bed of the adipamide powder, fluidized with compressed air at a supply pressure of about 3½ atmospheres. The particle size of the powder was about 40 mesh. The coated mold was postheated for a very short time with a gas flame and then allowed to cool in the atmosphere. The coating thickness was approximately 0.015 inch.

The coated mold was then boiled for several minutes in water and the mold was thereafter removed from the water. The coating was then quickly stripped from the mold as a unit. The resulting thin cylinder of polyamide, which was closed at one end, was used as a masking cap for painting operations. This article was smooth and continuous; that it, it did not contain any openings.

The best mold for the purpose of producing thin self-supporting articles of the coating material by means of stripping the coatings from the mold are those which do not employ predominantly convex surfaces so as to avoid the natural adherence of the coatings due to contraction on the mold. Thus, if a concave mold is employed in which an interior surface is coated, if the surface is highly polished, the coating will contract away from the mold surface upon cooling and the article formed of the coating material is easily removed from the mold without the necessity for any boiling procedures.

The increase in volume of the fluidized bed as compared with the bed when no gas is flowing through it will vary dependent upon the gas flow rate and upon the size and shape and density of the particles of coating material. It may be generally stated, however, that this apparent increase in the volume of the material will range from approximately 20 percent to 120 percent of the initial volume. This range is particularly applicable to the thermoplastic resin materials such as the nylon polyhexamethylene adipamide as described in Example 6 and high molecular weight polyethylene.

In general, the smaller and lighter the particles, the greater will be the increase in volume upon fluidization. It should be understood, also, that with the finely divided particles such as are described in most of the above-mentioned examples, the volume occupied by the powder, even when unfluidized, will be approximately twice the volume which would be occupied by the same material if in the form of a single, solid piece. Accordingly, there will be in the order of approximately a 50 percent air or gas proportion in the unfluidized mass of coating material particles before fluidization. Also, with extremely fine, fluffy particles of some materials, this proportion of gas may rise as high as 80 percent.

The articles to be coated may be easily manually dipped into the fluidized bed 14 of coating material, or if desired, suitable mechanical means may be provided for the dipping and the shaking (to and fro) movement of the immersed article.

Figure 2:
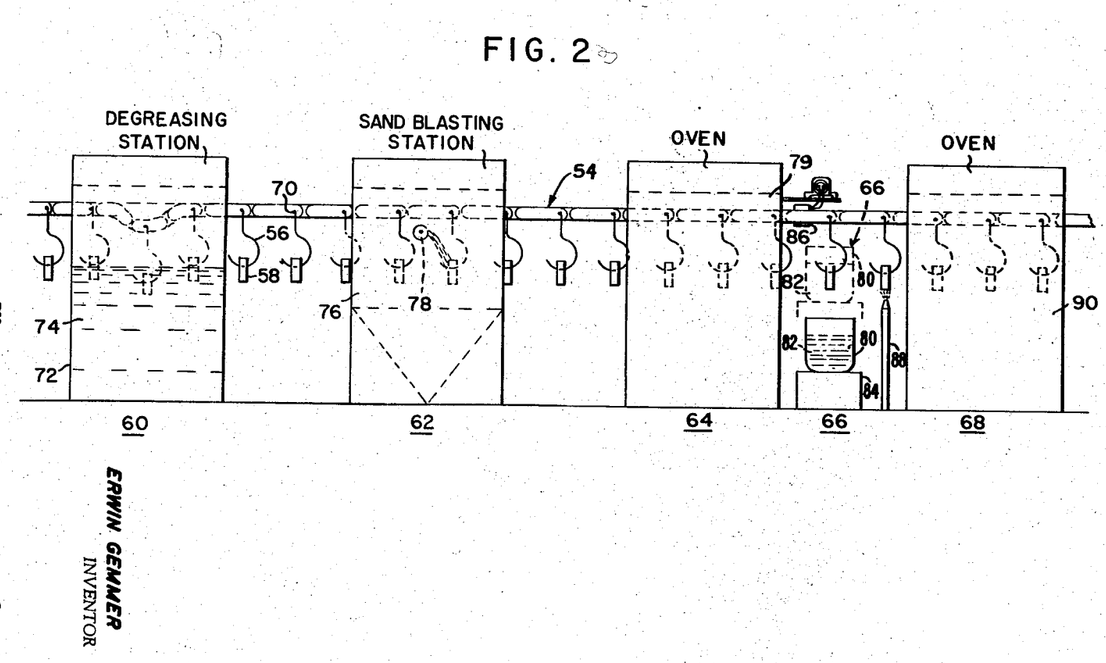
Fig. 2 is a generally schematic view of a treating system embodying the present invention.

In large-scale production, the process is preferably carried out by means of a completely conveyorized system such as illustrated in Fig. 2. In this system, a chain-type conveyor 54 having article-supporting hooks 56 on which articles 58 are suspended, is arranged to pass successively through a series of treating stations. These stations, which are schematically represented, are shown as comprising a degreasing station at 60, a sandblasting station at 62, a preheating oven at 64, a coating station at 66 and a postheating oven at 68.

The chain conveyor 54 is of the conventional type comprising a pair of parallel chains arranged on oppositely positioned sprockets, not shown, for intermittent or indexing movement around a horizontal path. Extending between the corresponding links of each chain are rods 70. Each hook 56 is hung on a rod 70.

At the degreasing station 60 the chain conveyor passes through oppositely arranged openings in the housing 72 containing a solvent 74. After passing through the solvent, the articles 58 are conveyed to the sandblasting station 62 which comprises a sandblasting chamber 76 in which is positioned a throwing-wheel 78 which sandblasts the articles as they pass through. Although a throwing-wheel type of abrading device has been shown in the drawing, this is merely for illustrative purposes, since any type of sandblasting apparatus may be used. The conveyor, of course, passes through slots in the chamber 76 in the same manner as at station 60. The slots in the chamber 76 are provided with cover means for the slots of the type generally used in sandblasting devices.

After leaving the sandblasting station, the conveyor moves the articles through the preheating station 64 which comprises an oven 79 maintained at the required predetermined temperature which depends on the material from which the article is made as well as on the coating material and the size of the particles thereof.

After leaving the oven 79, through which it passes by means of appropriate entrance and exit slots, the conveyor moves the article into the coating station 66. At this station there is provided a tank 80 having a fluidized bed of coating material 82 therein. This container is positioned on a lifting apparatus, indicated generally at 84. This lifting device is preferably fluid-pressure actuated, i. e. pneumatic or hydraulic, and this fluid pressure system, not shown, is operated automatically, preferably through solenoid valves, not shown, which are, in turn, electrically connected to the conveyor-drive motor for synchronous actuation with the conveyor. This pressure-control system is not shown in detail in the drawings since it may be of standard construction and, by itself, forms no part of the present invention.

The vertical movement of the fluidized bed tank is so timed with the intermittent movement of the conveyor that when an article 58 comes into position over the tank, the tank will move upwardly to the position shown in dotted outline to encompass the article which then hangs suspended from the now motionless conveyor. At this time, a lateral vibration is provided on the conveyor by means of a split ring, generally indicated at 86 to produce a to and fro motion of the article immersed in the fluidized bed. This ring 86 which encompasses this portion of the conveyor path is operated by the conveyor drive-motor, not shown, in timed relationship with the movement of the conveyor and of the vertically movable fluidized bed tank 80.

After the desired period of immersion has elapsed, the fluidized bed tank again descends to the position shown in full line in Fig. 2, the vibratory operation of the ring 86 stops, and the conveyor indexes the article, which has just been immersed, to the next position. At this next position, there are provided one or more compressed air nozzles 88 which are arranged to either continuously or intermittently direct streams of rapidly moving air at the article, in order to remove small amounts of excess powder which may adhere to portions thereof. If the operation of the nozzles 88 is continuous, they may be operated by an independent motor or other actuating means. However, if the operation is an intermittent one, the control valves for the nozzles are preferably of the solenoid type and are actuated by the conveyor drive-motor in timed relationship with the movement of the conveyor.

Further movement of the conveyor carries the coated article into the housing 90 of postheating oven 68. This oven 68 is similar to preheating oven 64 and is also maintained at a desired predetermined temperature. Of course, if no postheating is necessary, oven 68 may be omitted or the operation of oven 68 can be dispensed with. In such case, it is allowed to remain inoperative and the conveyor merely passes through, commencing the cooling portion of the cycle as described below. The preheating and postheating ovens 64 and 68 may be of the hot air variety, deriving heat from electrical heating coils, or the burning of a fuel such as gas or fuel oil, or other conventional means. It will be appreciated, of course, that radiant heating or induction heating or other specialized heating systems may be advantageously employed for this purpose.

After leaving the postheating oven, and before unloading, the articles may be permitted to remain on the conveyor until they cool and the coating solidifies. In some cases it is desirable, and not harmful to the coating, to accelerate the cooling step by quenching the articles in a liquid such as water or in a refrigerated atmosphere.

The various indexing movements of the conveyor are preferably varied according to the treatments. Since some steps of the process require a greater length of time than others, the speed of the conveyor must be so adjusted that a sufficient time is spent at each treating station. In the case of a long treating step, as at the preheating or postheating stations, the article will be in operative position at all times during its stay at such station. On the other hand, where the opertaion is relatively rapid, as at the sandblasting station or the coating station, the article will remain out of operative position or the treating apparatus will remain inoperative for a time sufficient to correlate it with the oven treatment. The oven treatment may be considerably shortened by making the ovens of great length so that a proportionally greater portion of the travel of the conveyor will be through the ovens and, therefore, there need be less stopping of the conveyor.

The duration of the various portions of the cycle of operation of the apparatus disclosed in Fig. 2 are preferably 2 to 5 seconds; coating—5 to 30 seconds; transition from preheating to coating—as short as possible, preferably 2 to 5 seconds; coating—5 to 20 seconds; transition from coating to excess powder removal—15 to 60 seconds; excess powder removal—5 to 15 seconds; transition from excess powder removal to postheating—15 to 60 seconds; postheating—up to 10 minutes; cooling—30 to 60 minutes.

Although the system, described above, may be operated with a single conveyor speed, it may be desirable to have at least two speeds for various stages of travel so that the conveyor may be operated at slow speed in the longer portions of the cycle and at faster speeds in the rapid portions of the cycle. Such multiple speed systems may be achieved in a number of ways; as for example, by using a free-hanging primary conveyor such as shown in Fig. 2, during the first stages of the operation, and then using secondary "pusher" conveyors to advance the various portions of the primary conveyor at the various desired speeds.

Instead of making the operation an intermittent one, it is possible to have a continuous cycle of operation. In this continuous system, the conveyor is permitted to move at a speed determined by its shortest operation, while the greater amount of time necessary for the longer operations is provided for by a longer path of travel through these stations. This may be accomplished, for example, by making the ovens at such length that the speed of travel of the conveyor through the distance covered by the oven will coincide with the required heating time.

In such a continuous operation, instead of having the fluidized bed container vertically movable, the container is stationary and this portion of the conveyor is formed to provide movement of the articles into and out of the container. To perform this operation most efficiently, the container should be in the form of a vat having outwardly sloping sides and a flat bottom and having a length sufficient to correspond with the speed of the conveyor to provide the required immersion time. The path of travel of the conveyor through the fluidized bed should be arranged correspondingly.

This invention is applicable to a wide diversity of different products. In order to demonstrate the utility of the invention in the foregoing paragraphs, an indication is given as to a few of the products for which the coatings produced in accordance with this invention are useful. In some instances, the name of a single machine or a category of machines is indicated, and it is to be understood that such names are meant to indicate that various components and parts of such machinery may be coated by this process. Products in which such coatings are found to be useful are as follows.

Applications in the chemical field include pumps, valves, racks for holding parts in liquid chemical baths such as plating baths, food handling machinery such as conveyor chutes and pastry dough pickup fingers, laboratory equipment, storage and shipping containers, probes and anodes made of materials such as magnesium and copper for chemical reaction tests (the coating shielding the sides of the probe to permit reaction at the ends only) and immersion heater tubes for chemical baths.

In the electrical field, suitable articles include transformer components, dynamo electric machines and parts such as rotors and stators for providing slot insulation prior to insertion of the windings, electrical conductors, battery boxes and other parts, welding electrodes, radar and radio components, connectors of the solderless type, magnetic cores and laminations, ceramic printed circuits, switch components, and lighting fixtures.

Notable applications in home appliances include radio and television cabinets and chassis, vacuum cleaners, refrigerator components including ice cube trays, shelves and racks, dishwashers and clothes washer components, such as impellers, balance rings, and shelves and racks.

Building supplies such as the following may be advantageously coated: water heater and softening tanks, metal parts, window hardware, frames and sashes, panels and doors, bathroom and kitchen fixtures such as soap dishes, towel racks, etc., plumbing parts and fittings, and door hinge pins.

Machinery components and mechanical elements that may be coated include gear blanks and gears, sleeve bearings, and other bearings, cams and cam followers, wheels for vehicles and other machines such as machine tools and electric switch gear, metal springs, and bobbins, spindles and other textile machine components, particularly parts which physically engage the textile filaments and threads, conveyor parts such as hooks, chains, links, screw conveyors, molds and dies, polishing laps and burnishing tools (incorporating polish compound in coating), components for business machines such as typewriters, calculators and computors, sieves, tachometer cables, fountain pen caps, ink cartridges, and other parts, metal arch supports, metal stays, buckles and other small parts for clothing, oil well drilling, pumping and pipe line equipment, bicycle parts, parts formed from sintered powdered metal, sewing machine parts, automobile parts, such as air spring pistons and parts, highway signs and guard rails, marine parts and hardware such as propellers, anchors and outboard motor components and the like, handles for wrenches, scissors, screw drivers, and other hand tools and appliances.

Obviously many modifications and variations of the present invention are possible in the light of the above teachings. It is, therefore, to be understood that within the scope of the appended claims the invention may be practiced otherwise than as specifically described.

I claim:

1. The process of forming a layer of material on a surface of an article which comprises forming a fluidized bed consisting of a dense phase bounded by an upper free surface by passing a distributed ascending current of gas at a predetermined pressure through a mass of solid, pulverulent, layer-forming material containing particles therein which sinter when heated, immersing the article surface in said dense phase while said article is heated to a temperature below the deterioration temperature of the article but at least as high as the sintering temperature of said particles, moving said article surface to and fro while it is immersed thereby to produce a uniform layer of said material on said surface, and cooling the article.

2. The process of coating an article which comprises forming a fluidized bed consisting of a dense phase bounded by an upper free surface by passing a distributed ascending current of gas at a predetermined pressure through coating material consisting at least in part of a mass of solid, pulverulent material which has a melting point lower than the deterioration point of the article, heating the article to a temperature which lies between the melting point and the decomposition point of the pulverulent material and below the deterioration point of the article, immersing the heated article in said dense phase for a predetermined period of time while moving the article to and fro thereby to produce a uniform layer of said pulverulent material on the surface of said article and then removing the article from said dense phase to cause the heat of the article to coalesce the pulverulent material in the layer.

3. The process of forming a layer of material on a surface of an article which comprises forming a fluidized bed consisting of a dense phase bounded by an upper free surface by passing a distributed ascending current of gas at a predetermined pressure through a mass of solid, pulverulent, layer-forming material containing particles therein which sinter when heated, said predetermined pressure being such as to effect a distributed flow of said gas through said dense phase while maintaining a zone above said upper free surface free of significant quantities of said material in dispersed suspension so that substantially all of said material remains in said dense phase, immersing the article surface in said dense phase while said article is heated to a temperature below the deterioration temperature of the article but at least as high as the sintering temperature of said particles, moving said article surface to and fro while it is immersed thereby to produce a uniform layer of said material on said surface, and cooling the article.

4. The process of forming a layer of material on a surface of an article which comprises forming a fluidized bed consisting of a dense phase bounded by an upper free surface by passing a distributed ascending current of gas at a predetermined pressure through a mass of solid, pulverulent, layer-forming material containing particles therein which sinter when heated, immersing the article surface in said dense phase while said article is heated to a temperature below the deterioration temperature of the article but at least as high as the sintering temperature of said particles, moving said article surface to and fro while it is immersed thereby to produce a uniform layer of said material on said surface, then withdrawing the article from the dense phase, heating the article to improve the coating adhering thereto, and cooling the article.

5. The process of forming a layer of material on a surface of an article which comprises forming a fluidized bed consisting of a dense phase bounded by an upper free surface by passing a distributed ascending current of gas at a predetermined pressure through a mass of solid, pulverulent, layer-forming material containing particles therein which sinter when heated, immersing the article surface in said dense phase while said article is heated to a temperature below the deterioration temperature of the article but at least as high as the sintering temperature of said particles, moving said article surface to and fro while it is immersed thereby to produce a uniform layer of said material on said surface, then withdrawing the article from the dense phase and removing excess coating material on the outer surface of the coating layer having deficient coherence to the underlying portions of the layer by exposure to a rapidly moving current of gas, and cooling the article.

6. The process of forming a layer of material on a surface of an article which comprises forming a fluidized bed consisting of a dense phase bounded by an upper free surface by passing a distributed ascending current of gas at a predetermined pressure through a mass of solid, pulverulent, layer-forming material consisting essentially of discrete solid particles in a solid, pulverulent carrier, said carrier having a melting point which is lower than the temperature of the article while immersed, said discrete particles being incapable of melting at the temperature of said article, immersing the article surface in said dense phase while said article is heated to a temperature below the deterioration temperature of the article but at least as high as the melting temperature of said carrier, moving said article surface to and fro while it is immersed thereby to produce a uniform layer of said material on said surface, and cooling the article.

References Cited in the file of this patent

UNITED STATES PATENTS

| | | | |
|---|---|---|---|
| 468,810 | Leach | Feb. 16, | 1892 |
| 1,256,000 | Fairburn | Feb. 12, | 1918 |
| 1,534,846 | Fraser et al. | Apr. 21, | 1925 |
| 2,059,983 | Dent et al. | Nov. 3, | 1936 |
| 2,135,081 | Kaplan | Nov. 1, | 1938 |
| 2,342,661 | Gunnell | Feb. 29, | 1944 |
| 2,395,157 | Work et al. | Feb. 19, | 1946 |
| 2,399,717 | Arveson | May 7, | 1946 |
| 2,414,625 | Abramse et al. | Jan. 21, | 1947 |
| 2,496,070 | Selsky | Jan. 31, | 1950 |
| 2,520,658 | Rheem et al. | Aug. 29, | 1950 |
| 2,600,253 | Lutz | June 10, | 1952 |
| 2,648,609 | Wurster | Aug. 11, | 1953 |
| 2,654,925 | Ensign et al. | Oct. 13, | 1953 |
| 2,661,307 | Foster | Dec. 1, | 1953 |
| 2,719,093 | Voris | Sept. 27, | 1955 |
| 2,728,686 | Borushko | Dec. 27, | 1955 |
| 2,729,194 | Jones | Jan. 3, | 1956 |

FOREIGN PATENTS

| | | | |
|---|---|---|---|
| 700,177 | Great Britain | Nov. 25, | 1953 |

OTHER REFERENCES

British Plastics, vol. 23, No. 255, August 1950, pp. 56–59.

Fraser et al.: "Artificial Strom of Air-Sand Floats Coal on its Upper Surface, Leaving Refuse to Sink," Coal Age, vol. 29, No. 9, Mar. 4, 1926, pp. 325, 326, 327.

Parent et al.: "Fluidizing Processes," Chemical Engineering Progress, vol. 43, No. 8, August 1947, pp. 429–434.

Leva et al.: "Introduction to Fluidization," Chemical Engineering Progress, vol. 44, No. 7, July 1948, pp. 511 and 512.

Gemmer: "Der Heutige Stand des Kunstoff-spritzens and Pulversinterns," Industrice-Anzeiger, 75 Jahrgang, No. 12, Feb. 10, 1953, pp. 141–143.

UNITED STATES PATENT OFFICE
CERTIFICATE OF CORRECTION

Patent No. 2,844,489                         July 22, 1958

Erwin Gemmer

It is hereby certified that error appears in the printed specification of the above numbered patent requiring correction and that the said Letters Patent should read as corrected below.

Column 5, line 23, for "greasly" read -- greasy --; column 10, line 49, for "that it" read -- that is --; column 12, line 54, for "opertaion" read -- operation --; line 63, the paragraph beginning with "The duration" strike out all to and including "30 to 60 minutes." in line 71, and insert instead -- The duration of the various portions of the cycle of operation of the apparatus disclosed in Fig. 2 are preferably as follows: Preheating—up to 30 minutes; transition from preheating to coating—as short as possible, preferably 2 to 5 seconds; coating—5 to 30 seconds; transition from coating to excess powder removal—15 to 60 seconds; excess powder removal—5 to 15 seconds; transition from excess powder removal to postheating—15 to 60 seconds; postheating—up to 10 minutes; cooling—30 to 60 minutes. --; column 13, line 65, for "metal" read -- meter --; column 16, line 33, list of references cited, under "OTHER REFERENCES" for "Artificial Strom" read -- Artificial Storm --; line 43, for "Industrice-Anzeiger" read -- Industrie-Anzeiger --.

Signed and sealed this 16th day of September 1958.

(SEAL)
Attest:

KARL H. AXLINE                              ROBERT C. WATSON Attesting Officer                              Commissioner of Patents